US010901300B2

(12) United States Patent
Campbell et al.

(10) Patent No.: US 10,901,300 B2
(45) Date of Patent: Jan. 26, 2021

(54) UNDERWATER CAMERA SYSTEM WITH SWITCHABLE FOCUS CAMERA

(71) Applicant: GoPro, Inc., San Mateo, CA (US)

(72) Inventors: Scott Patrick Campbell, Belmont, CA (US); Timothy Macmillan, La Honda, CA (US); Andrew Vargas Ganzon, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 670 days.

(21) Appl. No.: 15/589,933

(22) Filed: May 8, 2017

(65) Prior Publication Data

US 2018/0143514 A1    May 24, 2018

Related U.S. Application Data

(60) Provisional application No. 62/426,084, filed on Nov. 23, 2016.

(51) Int. Cl.
| | | |
|---|---|---|
| G03B 17/08 | (2006.01) | |
| H04N 5/225 | (2006.01) | |
| G03B 17/56 | (2006.01) | |
| G03B 37/04 | (2006.01) | |

(52) U.S. Cl.
CPC .......... G03B 17/08 (2013.01); G03B 17/561 (2013.01); G03B 37/04 (2013.01); H04N 5/2252 (2013.01); H04N 5/2253 (2013.01); H04N 5/2254 (2013.01); H04N 5/2258 (2013.01)

(58) Field of Classification Search
CPC .................................................... G03B 17/08
See application file for complete search history.

(56) References Cited

U.S. PATENT DOCUMENTS

| | | | | |
|---|---|---|---|---|
| 4,422,740 A | * | 12/1983 | Sumi .................... | G02B 7/08 359/704 |
| 4,634,253 A | * | 1/1987 | Tamamura ............. | G03B 17/08 396/103 |
| 4,860,038 A | * | 8/1989 | Thatcher ................ | G02B 23/22 396/25 |
| 7,495,843 B2 | * | 2/2009 | Ge .......................... | G02B 7/08 359/699 |

(Continued)

OTHER PUBLICATIONS

KNEKT, http://www.knektusa.com/video/, KNEKT KSD6 6" Dome Port : How to Clean / Replace Dome (product maintenance guide video), video N PL, relevant video at 2:50-3:10; product maintenance guide (Year: 2014/2015).

*Primary Examiner* — Clayton E. LaBalle
*Assistant Examiner* — Leon W Rhodes, Jr.
(74) *Attorney, Agent, or Firm* — Young Basile Hanlon & MacFarlane, P.C.

(57) ABSTRACT

A camera system includes a camera and an underwater housing. The underwater housing, when submerged underwater, causes refraction of light entering the camera, thereby affecting focus. The camera includes a lens assembly adjustable between a first secured position at a first distance from an image sensor to enable the camera to capture images that are in focus when the camera is outside of water. The lens assembly is adjustable to a second secured position at a second distance from the image sensor to enable the camera to capture images that are in focus when the camera operates within the underwater housing and submerged under water.

19 Claims, 11 Drawing Sheets

(56) References Cited

U.S. PATENT DOCUMENTS

| | | | |
|---|---|---|---|
| 8,369,034 B2 * | 2/2013 | Aiba | G02B 7/023 |
| | | | 359/819 |
| 8,902,318 B1 | 12/2014 | Haddad | |
| 9,933,816 B2 * | 4/2018 | Ranetkins | G03B 17/08 |
| 2015/0370150 A1 | 12/2015 | O'Neill | |
| 2016/0261829 A1 | 9/2016 | Olsson | |
| 2017/0059805 A1 | 3/2017 | Ranetkins | |
| 2017/0139309 A1 | 5/2017 | Axelsson | |
| 2018/0020160 A1 * | 1/2018 | Lin | H04N 5/2252 |
| 2018/0039163 A1 | 2/2018 | Halsey | |
| 2018/0045910 A1 | 2/2018 | ONeill | |
| 2018/0146122 A1 | 5/2018 | Campbell | |
| 2018/0152637 A1 | 5/2018 | Tolman | |
| 2019/0113826 A1 | 4/2019 | Nam | |

* cited by examiner

UNDERWATER CAMERA SYSTEM WITH SWITCHABLE FOCUS CAMERA

RELATED APPLICATIONS

This application claims the benefit of U.S. Provisional Application No. 62/426,084 filed on Nov. 23, 2016, the content of which is incorporated by reference herein.

BACKGROUND

Technical Field

This application relates generally to a camera system and more specifically to an underwater camera system for a camera.

Description of the Related Art

Operating a camera underwater may be desirable under a variety of situations. For non-waterproof cameras, a separate waterproof housing may be used to prevent damage to the camera. A challenge with existing underwater housings is that the housing may refract light passing through it, thereby distorting the images captured by the camera when used within the housing and affecting field of view and focus. This effect is particularly problematic when it may be desirable to move in the camera in and out of water.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A camera system includes a camera an underwater housing. The underwater housing, when submerged underwater, causes refraction of light entering the camera, thereby affecting focus. The camera includes a lens assembly adjustable between a first secured position at a first distance from an image sensor to enable the camera to capture images that are in focus when the camera is outside of water. The lens assembly is adjustable to a second secured position at a second distance from the image sensor to enable the camera to capture images that are in focus when the camera operates within the underwater housing and submerged under water.

In a particular embodiment, the camera comprises an image sensor positioned on an image plane and a lens assembly to focus light onto the image sensor. The lens assembly comprises a lens barrel housing a plurality of lens elements. The lens barrel is adjustable between a first secured position at a first distance from the image sensor and a second secured position at a second distance from the image sensor. Light passing through the lens assembly is focused on the image plane when the camera is in open air and the lens barrel is in the first secured position. A watertight housing encloses a volume of air around camera. The watertight housing comprises a dome. Light passing through the dome and the lens assembly when the watertight housing is submerged underwater is focused onto the image plane when the lens barrel is in the second secured position at the second distance from the image sensor. A mount holds the camera within the watertight housing.

Camera

Figure 1A:
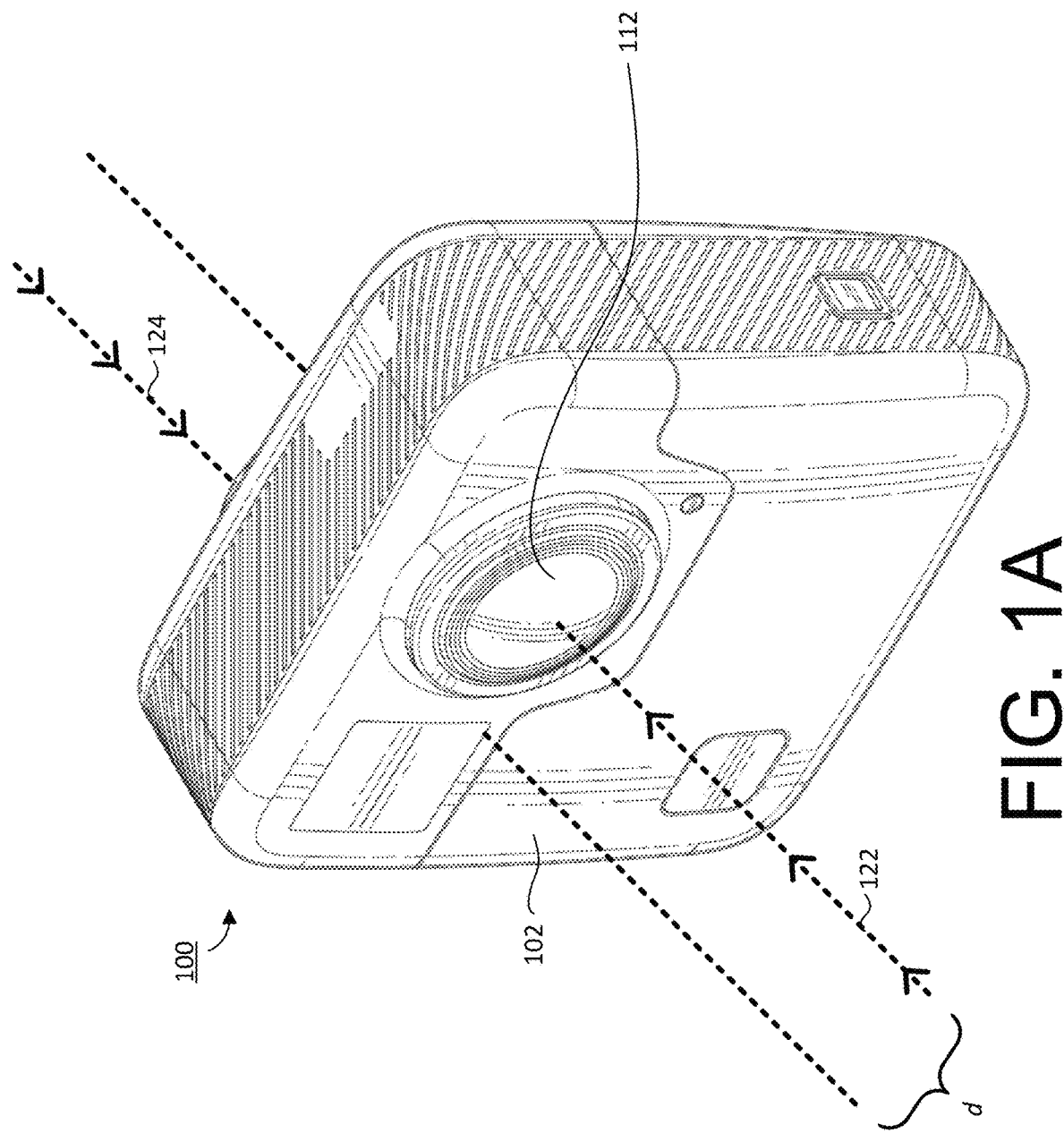
FIG. 1A is a first perspective view of an embodiment of a dual-lens camera.
Figure 1B:
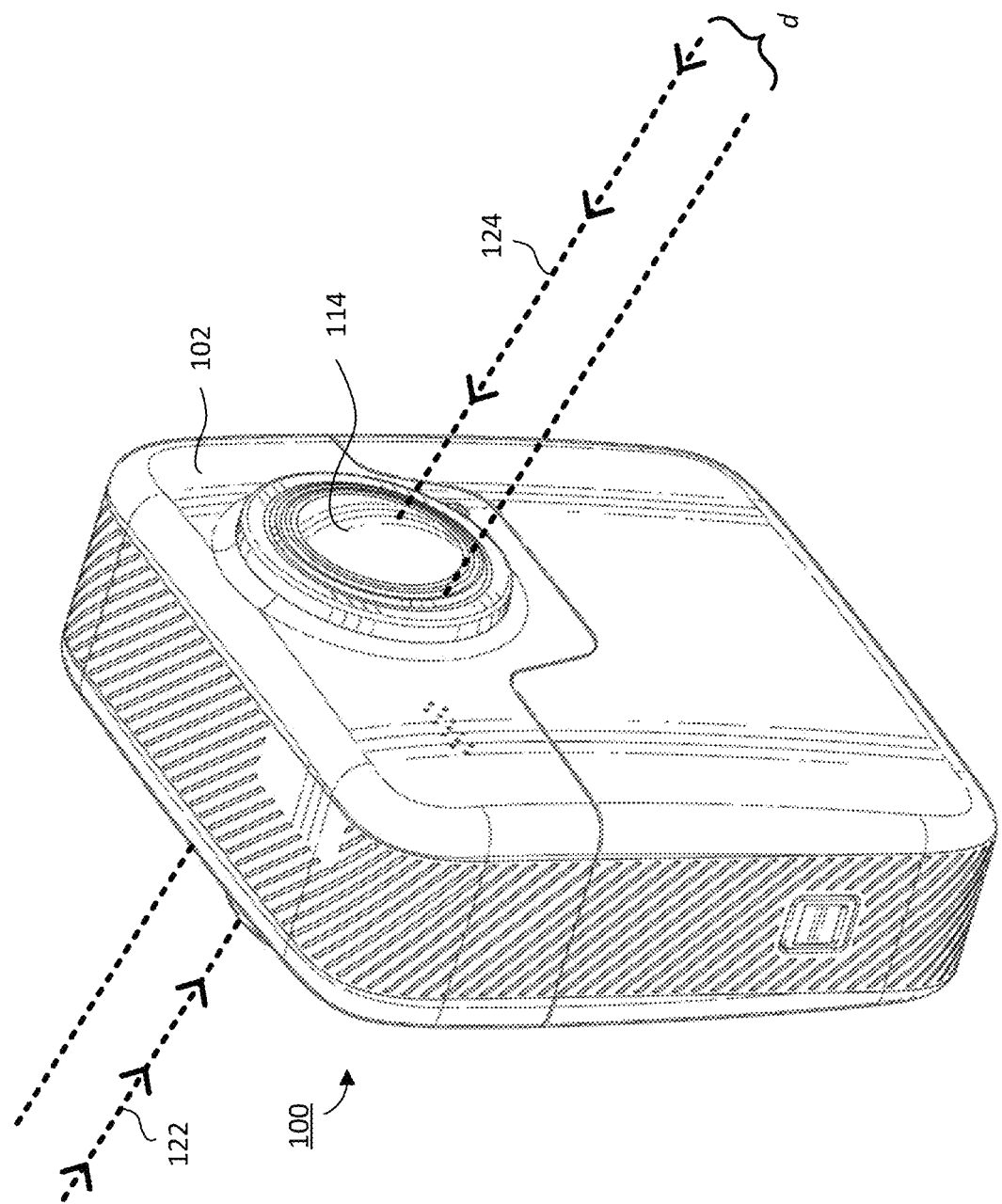
FIG. 1B is a second perspective view of an embodiment of a dual-lens camera.

FIGS. 1A-1B are perspective views illustrating an example embodiment of a dual-lens camera 100. In an embodiment, the camera 100 captures a spherical or near-spherical field of view. For example, in one embodiment, the camera 100 comprises two lens assemblies 112, 114 on opposite faces of the camera body 102. The lens assemblies 112, 114 may each capture a hemispherical or hyper-hemispherical field of view that can be stitched together to generate spherical images. In an embodiment, the lens assemblies 112, 114 are laterally offset from each such that their respective optical axes 122, 124, are separated by a lateral distance d and are anti-parallel to each other (e.g., receive light from opposite directions).

Figure 2:
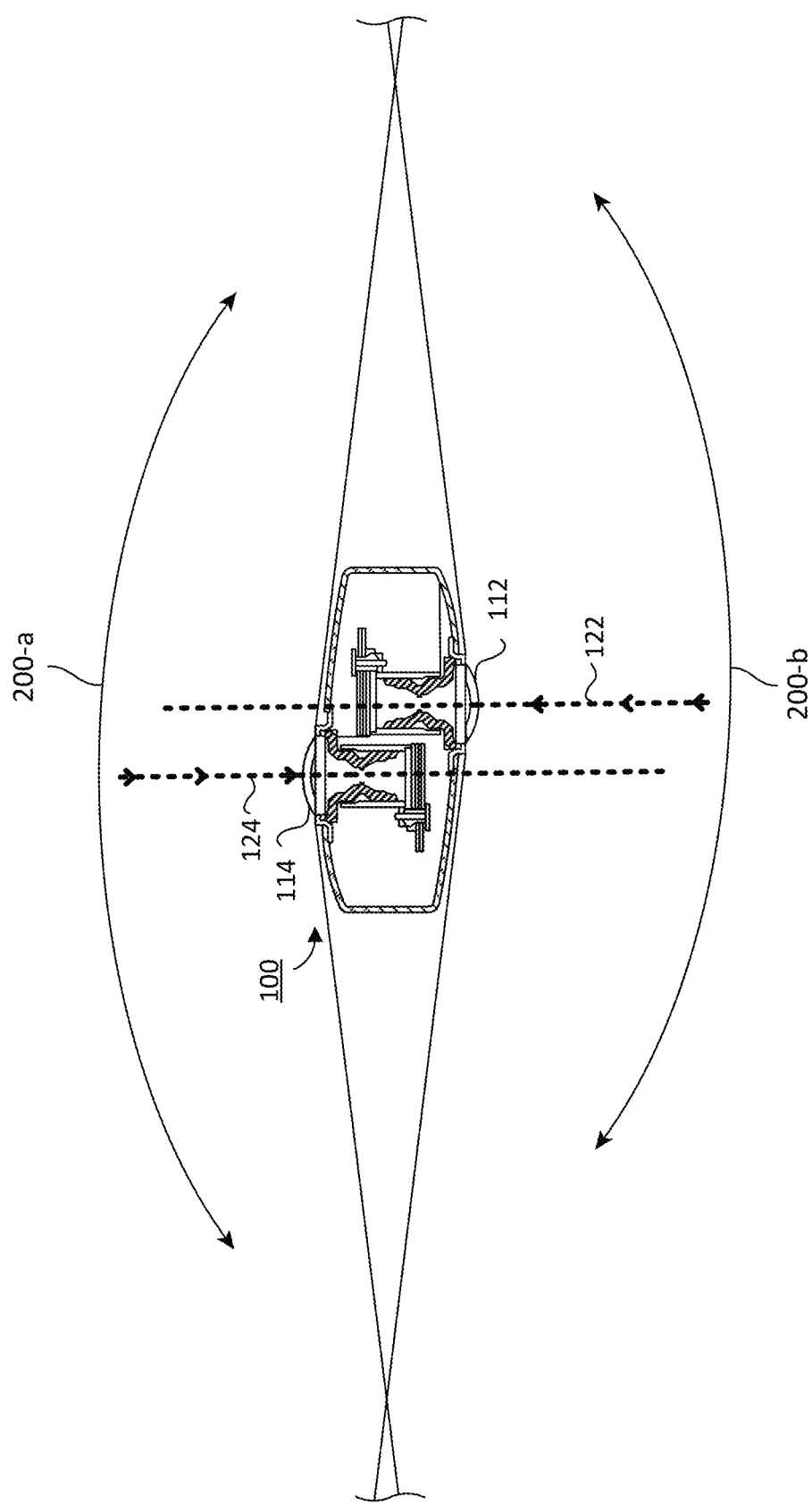
FIG. 2 is a top view of an embodiment of a dual-lens camera.

FIG. 2 is a top cross-sectional view of the camera showing the offset configuration of the lens assemblies 112, 114 and respective optical axes 122, 124. The lens assemblies 112, 114 each have respective hyper-hemispherical fields of view 200-a, 200-b.

Although FIGS. 1-2 illustrate a dual-lens camera, the embodiments described herein may also apply to a camera with a single lens assembly or to cameras with more than two lens assemblies.

Underwater Housing Structure

Figure 3:
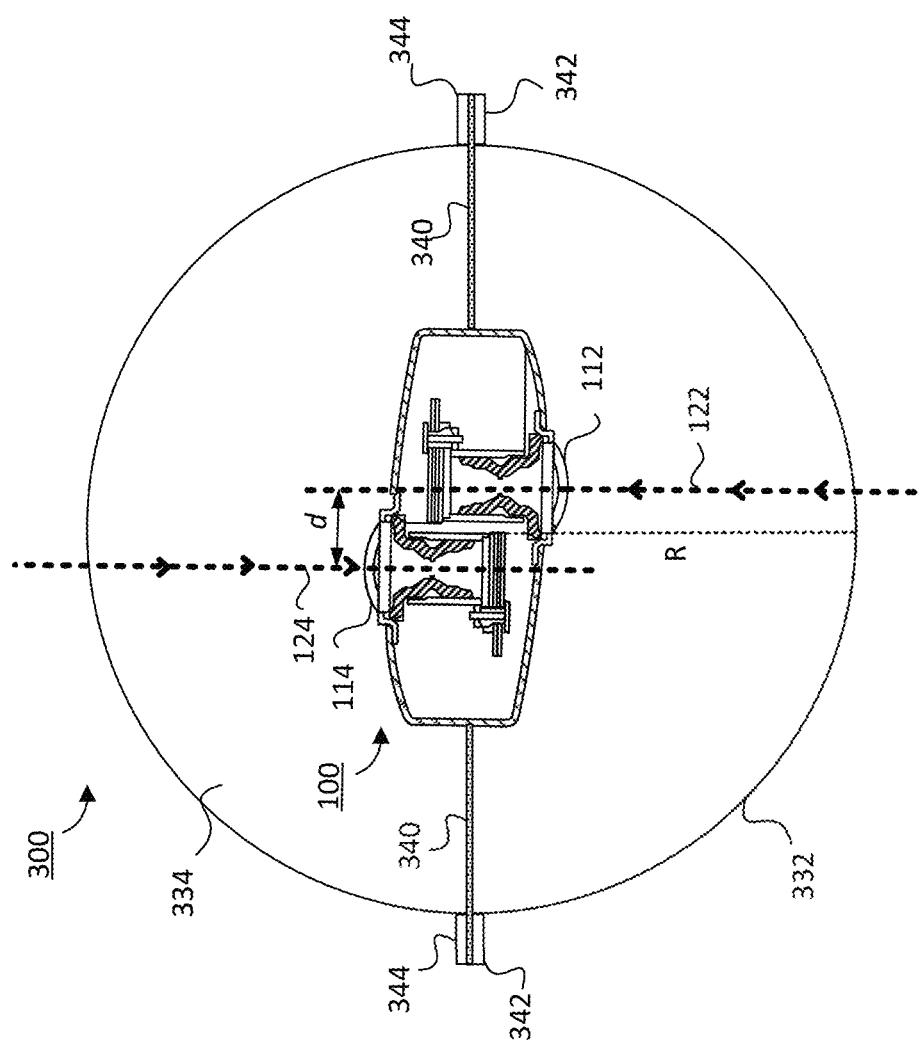
FIG. 3 is a top view of an embodiment of a dual-lens camera in an underwater housing.

FIG. 3 illustrates a top cross-sectional view of an underwater housing 300 for housing a dual-lens camera 100. The housing 300 comprises a center mounting plate 340, a first dome 332, and a second dome 334. The mounting plate 340 may comprise a rigid material (e.g., machined aluminum or hard plastic) and may have a cutout in which the camera 100 may be mounted. The first dome 332 and second dome 334 may each comprise a transparent waterproof material (e.g., plastic) shaped as a hemisphere, a quasi-hemisphere, a raised hemisphere comprising a hemispherical portion and a cylindrical portion, a shortened hemisphere comprising a less than 180 degree portion of a circular arc, a parabolic dome, or other convex or lens shape. The first dome 332 may comprise a flange portion 342 around an edge of the dome 332 (thus, forming a ring) that extends radially from the dome 332 and may be structured such that a flat surface of the flange portion 342 mates with a first surface of the mounting plate 340. Similarly, the second dome 334 may comprise a flange portion 344 around an edge of the dome 334 (thus forming a ring) that extends radially from the dome 334 and may be structured such that a flat surface of the flange portion 344 mates with a second surface of the mounting plate 340. The flange portions 342, 344 may be fastened to the mounting plate 340 by a fastener such as a screw, nut and bolt, clip, or other fastener. In an embodiment, the domes 132, 134 are coupled to the mounting plate 140 in a back-to-back configuration with their respective edges aligned to form a substantially spherical structure. A camera mount secures the camera 100 within the housing 300.

Figure 4:
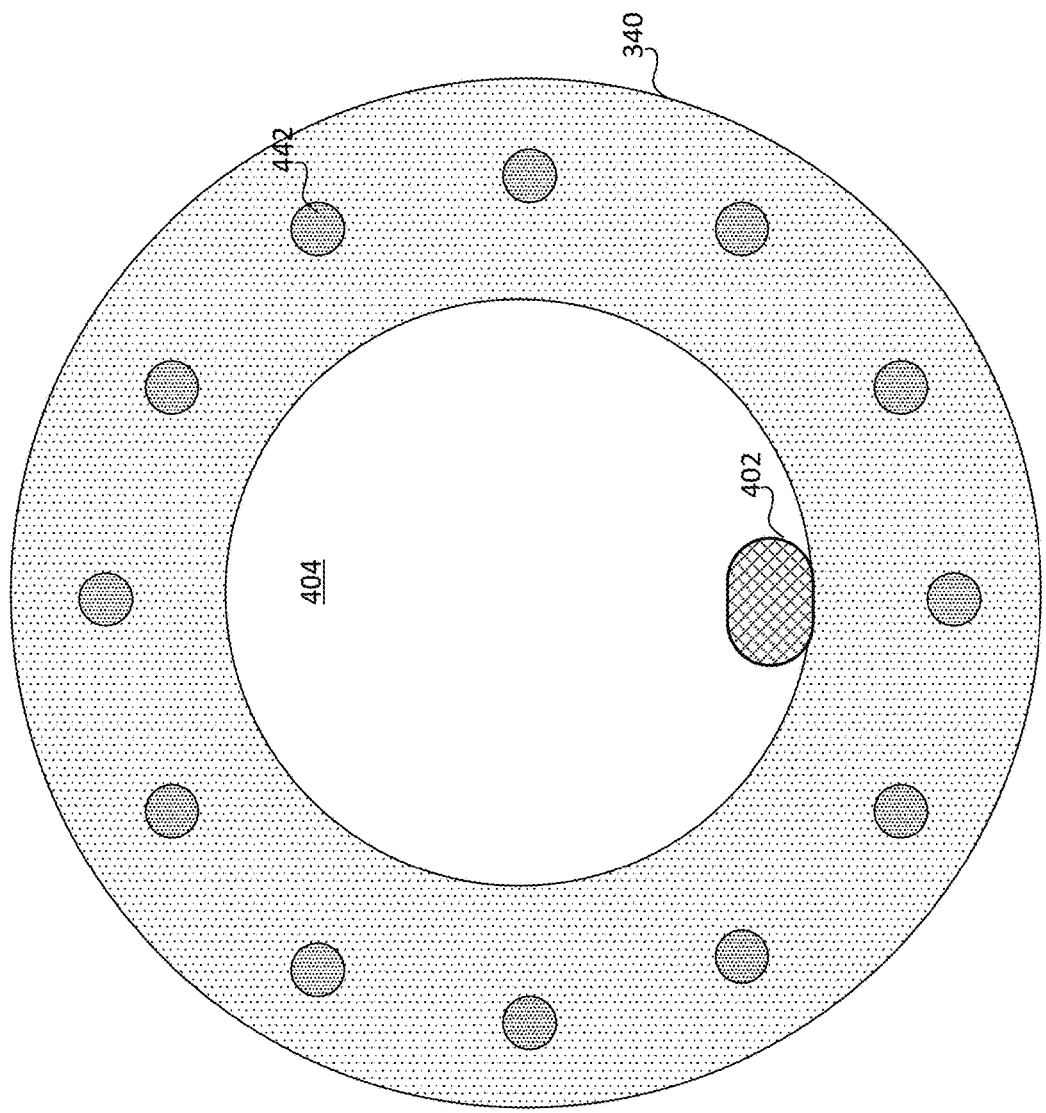
FIG. 4 is a front view of an embodiment of a mounting plate for an underwater housing for a dual-lens camera.

FIG. 4 illustrates a front view of an example embodiment of the mounting plate 340. The mounting plate 340 includes a cutout 404 in which the camera 100 is mounted via a mounting structure 402. In an embodiment, the mounting plate 340 comprises a ring structure. In an embodiment, fastening locations 442 are provided on the mounting plate 340 that enable a dome 132 to be coupled to the mounting plate 340. The mounting structure 402 may be oriented at a fixed angle relative to the plane of the mounting plate 340 or may comprise a swivel-mount that enables the camera to swivel to an arbitrary angle.

Figure 5:
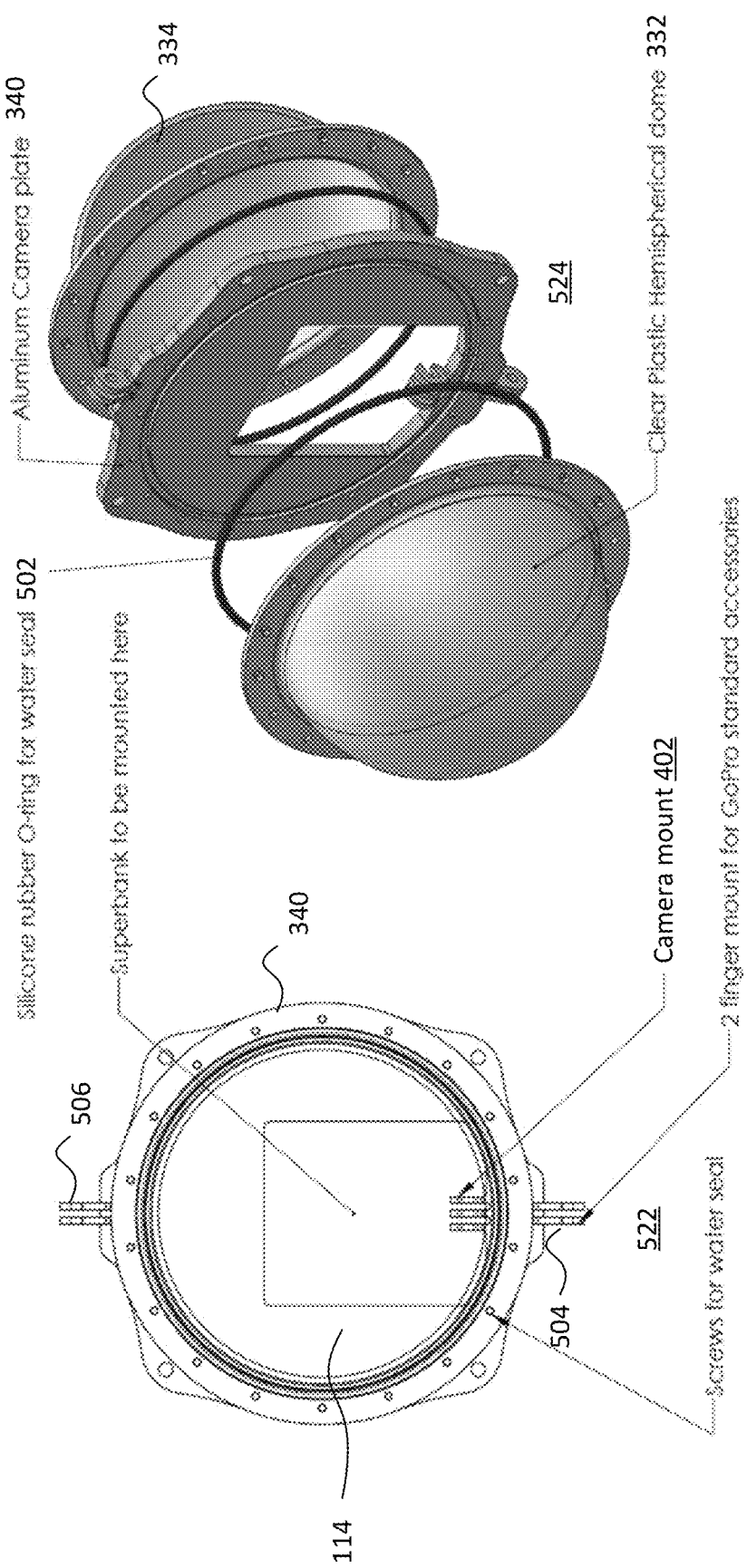
FIG. 5 is a perspective and exploded view of an embodiment of an underwater housing for a dual-lens camera.

FIG. 5 illustrates a front view 522 and an exploded perspective view 524 of an example embodiment of an underwater housing 300 for housing a dual-lens spherical camera 100. As illustrated in the exploded view 524, a sealing element 502 such as a silicone rubber O-ring may be placed between the dome 332 and the mounting plate 340 and between the dome 334 and the mounting plate 340 to provide a watertight seal between the domes 332, 334 and the plate 340. The embodiment of FIG. 5 also illustrates a particular embodiment of a camera mount 402 for mounting the camera 100 to the plate 340. In this example, a three finger mount 402 on the housing 300 may be interlocked with a reciprocal two finger mount (not shown) on the camera 100 and the camera 100 may be secured to the housing via a screw (not shown) that passes through aligned holes on the two finger of the camera 100 three finger mount 402 of the housing 300. The mount may be set at a fixed angle relative to the plane of the mounting plate 340 or may comprise an adjustable-angle mount. In an embodiment, additional two finger mounts 504, 506 may be located on an outer edge of the plate 340 and may provide attachment points for various external accessories.

As will be described in further detail below, the desired focal distance for optimal focus changes when the camera is placed within the housing 300 and submerged under water due to the optical characteristics of the water and the housing 300 compared to when the camera is used outside of the housing 300 in open air. To enable the camera to operate with the desired focus in either condition, a lens assembly 112, 114 of the camera may be adjustable between a first secured position optimized for use when the camera is in open air, and a second secured position optimized for use when the camera is within the housing 300 and submerged in water. Specifically, the lens assembly 112, 114 may be configurable to operate with two or more discrete focal distances and may be switched between these positions depending on the environment.

Although the embodiments described above illustrate a dual-dome housing for a dual-lens camera, alternative embodiments may include an underwater housing for a single-lens camera that may comprise only a single dome. For example, in one embodiment, the housing comprises a dome coupled to a circular plate.

Figure 6:
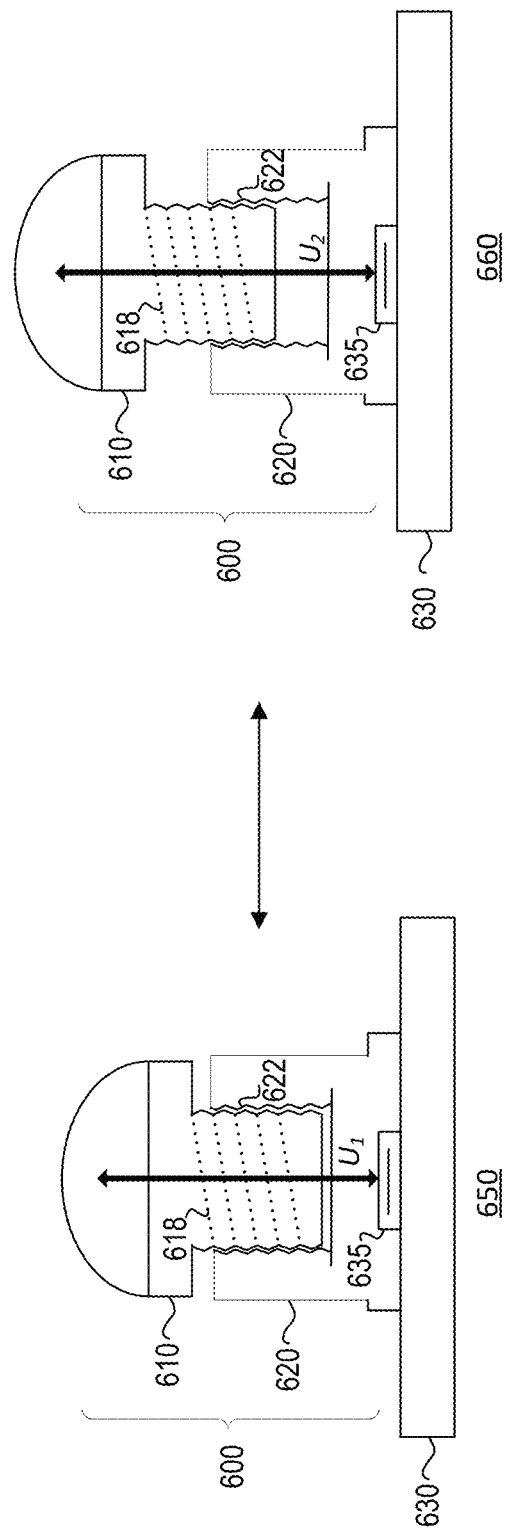
FIG. 6 is a diagram illustrating an embodiment of a lens assembly that is switchable between a first secured position and a second secured position.

FIG. 6 illustrates an example embodiment of a lens assembly 600 (e.g., corresponding to lens assembly 112 or 114) of the camera. The lens assembly includes a lens barrel 610 and a lens mount 620 mounted on an image sensor substrate 630 over an image sensor 635. The camera lens mount 600 and image sensor 635 may each be physically affixed to the image sensor substrate 630.

The lens barrel 610 may comprise a (e.g., a compound lens) having a plurality of lens elements or other optical components to direct light to the image sensor 635. The lens barrel 610 may include a fastening structure such as threads 618 in a helical pattern on the outer surface of the lens barrel 610 that mate with reciprocal threads 622 on an inner surface of the lens mount 620. Rotating the lens barrel 610 within the lens mount 600 causes the vertical position (along the optical axis) to change. For example, the lens barrel 610 can be rotated in a first rotational direction to lower the lens barrel 110 with respect to image sensor 635 and thereby decrease the distance to the image sensor 635 and can be rotated in a second direction to raise the lens barrel 610 with respect to the image sensor 635 and thereby increase the distance to the image sensor 635.

In an embodiment, mechanical stops or locking mechanisms may be positioned to enable the lens barrel 610 to be secured at two or more specific positions within the lens mount 610 at different distances from the image sensor 635. For example, the locking mechanism may prevent the lens mount 610 from being rotated (and thereby moved up or down) once in the specific position until the locking mechanism is released. The locking mechanism may comprise, for example, a pin, latch, or other mechanism that secures the lens barrel 610 at a given position.

Various mechanisms may be used to release the locking mechanism. For example, in one embodiment, the locking mechanism may be released when a separate button is depressed or switch is toggled. In another embodiment, the locking mechanism may be released when the rotational force exceeds a predefined threshold such that a greater force is required to move the lens barrel 610 out of the locked position than to move it once out of the locked position. In yet another embodiment, a force along the optical axis may cause the locking mechanism to be released. In yet another embodiment, the locking mechanism may be electronically controlled.

In an embodiment, the lens barrel 610 may be adjusted between a first secured position 650 in which a starting point of the lens barrel 610 (e.g., a middle of the first optical element) has a distance $U_1$ from the image sensor 635 and a second secured position 660 in which the starting point of the lens barrel 610 has a distance $U_2$ from the image sensor 635 (e.g., where $U_2 > U_1$). In alternative embodiments, additional locking mechanisms may be used to enable the lens barrel 610 to be secured (e.g. locked) at additional predefined secured positions with respect to the image sensor 635.

In an embodiment, a first locking mechanism of the lens assembly 600 is configured to secure the lens barrel 610 at a distance $U_1$ from the image sensor such that, based on the optical characteristics of the lens assembly 600, the an image plane on which the lens assembly 600 focuses an image will align with the plane of the image sensor 635 when the camera is in open air. A second locking mechanism of the lens assembly 600 is configured to secure the lens barrel 610 at a distance $U_2$ from the image sensor 635 such that the image plane on which the lens assembly 600 focuses an image will align with the plane of the image sensor 635 when the camera is within the housing and submerged under water.

In one embodiment, the lens barrel 610 may be manually rotated between the first secured position and the second secured position. Alternatively, an actuator may be used to electronically rotate the lens barrel 610 between the two or more predefined positions. In this embodiment, an electronic mode selection control may be used to control the position of the lens barrel 610 depending on the desired operating environment. In an embodiment, the mode selection may be automatically detected by the camera. For example, in one embodiment, a test image captured by the camera may be analyzed to automatically determine whether the camera is being operated in or out of water. In another embodiment, a mechanical sensor on the mount portion of the camera may detect when the camera is mounted or unmounted from the housing 300 and automatically configure the mode in response.

In an embodiment, the lens assembly 600 is switchable to a third secured position in between the first and second positions. For example, in one embodiment, the third secured position has an image distance $U_3$ halfway between $U_1$ and $U_2$. In this position, the camera may be slightly out of focus both in open air and in water but the focal quality loss may be within an acceptable range. This position may be desirable if the camera is going to be quickly moved in and out of water or moved in and out of water during a continuous video capture and it is not desirable to switch the focus prior to changing environments.

Analysis of the effects on focal distance caused by the dome and submersion in water that dictate the distances $U_1$ and $U_2$ are discussed in further detail below.

Analysis of Dome Effects

The image distance from the lens barrel 610 to the image plane changes when the camera (and dome system) is moved in and out of water. There are two effects herein that will alter where the image plane lands relative to a sensor plane (e.g., the focus shift), 1) the curvature of the dome induces a negative optical power when inserted underwater thereby increasing the desired image distance (U) and 2) the change in optical path length of the portion of the object distance that is in the water will induce an optical reduction in the overall object distance (though there is no change in the physical object distance) thereby increasing desired image distance. The geometry for this is diagrammed in FIG. 7.

Figure 7:
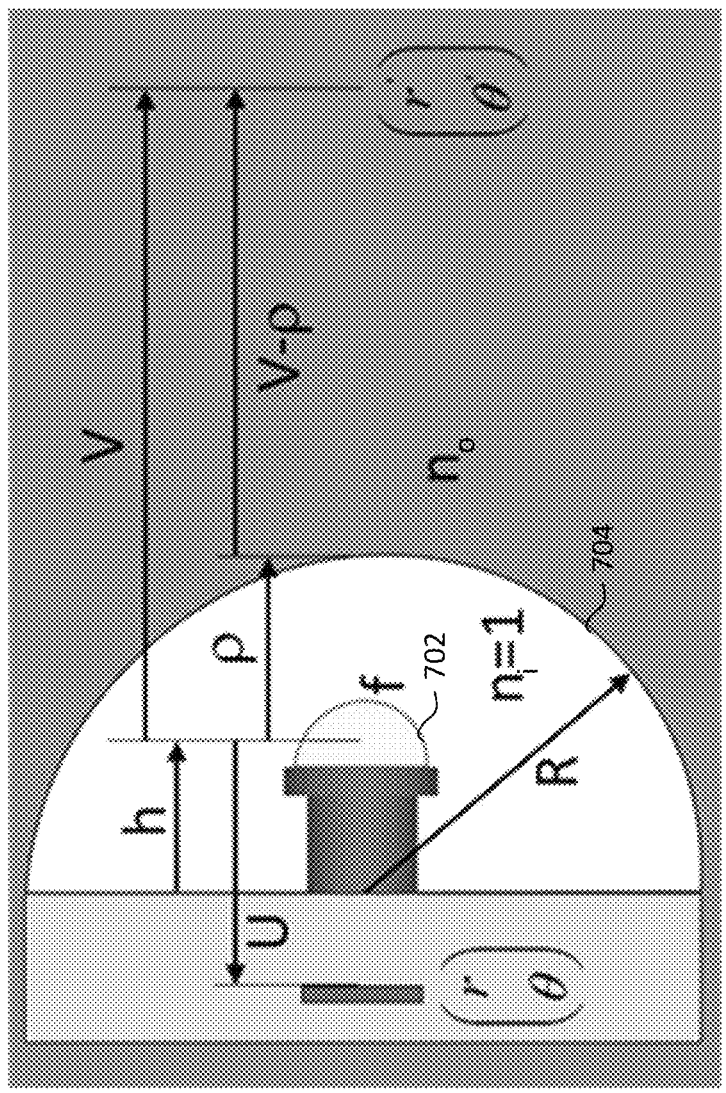
FIG. 7 is a diagram modeling the effect on field of view when an imaging lens is placed in a simple dome.

In FIG. 7, a lens assembly 702 has a start point at an axial distance h within a dome 704 relative to the start point of the dome 704 which is centered around the optical axis of the lens 702. The lens assembly 702 has a focal length f (which depends on the optical characteristics of the lens elements) and the dome has a radius R. The distance ρ represents the distance from the start point of the lens assembly 702 to the peak of the dome 704. The dome 704 is filled with air ($n_i \approx 1$). Outside of the dome 704, the refractive index is $n_o$ ($n_o \approx 1.33$ underwater). The ratio of the refractive indices is given by $n = n_o/n_i$. The object distance V represents the physical distance to an object as measured from the start point of the lens 702 to the object. The image distance U represents the distance from the start point of the lens assembly 702 to the image plane. Additional parameters include the input ray's height above the optical axis, r, the input ray's propagation angle relative to the optical axis, θ, the output ray's height above the optical axis, r', and the output ray's propagation angle relative to the optical axis, θ'. The imaging system in FIG. 7 may be analyzed under the paraxial approximation using the ABCD matrix mathematics. After analyzing the system, the image distance $U_1$ when the camera is in air (inside or outside of the dome) and the image distance $U_2$ when it is in water may be calculated.

The ABCD matrix multiplication equation for the optical system shown in FIG. 7 is given below, noting that this formalism works whether examining the system forwards or backwards.

$$\begin{pmatrix} r' \\ \theta' \end{pmatrix} = \begin{pmatrix} 1 & [V-\rho] \\ 0 & 1 \end{pmatrix} \begin{pmatrix} 1 & 0 \\ \Gamma & \frac{1}{n} \end{pmatrix} \begin{pmatrix} 1 & \rho \\ 0 & 1 \end{pmatrix} \begin{pmatrix} 1 & 0 \\ \frac{-1}{f} & 1 \end{pmatrix} \begin{pmatrix} 1 & U \\ 0 & 1 \end{pmatrix} \begin{pmatrix} r \\ \theta \end{pmatrix} \quad (1)$$

Herein, $$\Gamma = \frac{1-n}{R \cdot n} \quad (2)$$

In this geometry R<0 but U, V, ρ, h and n are all positive. In the formalization of the ABCD law for analyzing optical systems, all of the 2×2 optical element matrices can be multiplied into a single 2×2 matrix for the system. When this is done, the general form of Equation 1 becomes $$\begin{pmatrix} r' \\ \theta' \end{pmatrix} = \begin{pmatrix} A & B \\ C & D \end{pmatrix} \begin{pmatrix} r \\ \theta \end{pmatrix} \quad (3)$$

Expansion of Equation 3 then reveals $$r' = r \cdot A + \theta \cdot B \quad (4a)$$

$$\theta' = r \cdot C + \theta \cdot D \quad (4b)$$

Different values of U (e.g., $U_1$ and $U_2$) may be calculated to indicate the distances to keep the system in focus under different operating conditions (e.g., in water or out of water). If the input ray height is zero at the image plane (i.e., if the ray is on the optical axis at the image plane) then at focus the output ray height will also be zero at the object plane, and this will be true for all ray angles, θ. Examining Equation 4a, it can be seen that this condition is met if and only if the term B is equal to zero (at focus for r=0, r'=0 and θ=anything, so B=0 is required). Under this constraint it can be shown, $$U = \frac{\left(\rho + \frac{(V-\rho)}{n} + \rho \cdot (V-\rho) \cdot \left(\frac{1-n}{R \cdot n}\right)\right) \cdot f}{\rho + \frac{(V-\rho)}{n} + \rho \cdot (V-\rho) \cdot \left(\frac{1-n}{R \cdot n}\right) - \left(1 + (V-\rho)\left(\frac{1-n}{R \cdot n}\right)\right) \cdot f} \quad (5)$$

Equation 5 can be used to calculate the image distance $U_2$ that will keep images in focus when the dome is underwater (e.g., when $n_o$=1.33). When the camera is out of water (e.g., when n=1), Equation 5 simply reduces to $$U_1 = \frac{V \cdot f}{V - f}.$$

Furthermore, it can be seen that the dome has no impact on focus when system is out of water and thus the distance $U_1$ for focusing the lens is the same regardless of whether the camera is in the dome 704 or outside the dome 704.

Calculating the difference between $U_1$ and $U_2$ reveals the focus shift that occurs. Thus, presuming the camera is calibrated for perfect focus in air, it will be slightly out of focus when the system in placed in water. This change in image distance is given as, $$\Delta U = \frac{\left(\rho + \frac{(V-\rho)}{n} + \rho \cdot (V-\rho) \cdot \left(\frac{1-n}{R \cdot n}\right)\right) \cdot f}{\rho + \frac{(V-\rho)}{n} + \rho \cdot (V-\rho) \cdot \left(\frac{1-n}{R \cdot n}\right) - \left(1 + (V-\rho) \cdot \left(\frac{1-n}{R \cdot n}\right)\right) \cdot f} - \frac{V \cdot f}{V - f} \quad (6)$$

Using the equation above, the image distances $U_1$ and $U_2$ can be set based on the focal distance f of the lens assembly (which depends on the optical characteristics of the lens), the desired object distance V, and the distances $\rho$ and R based on the geometry of the dome and lens assembly. In an embodiment, the equations above can be further simplified by assuming V is very large such that $U_1 \approx f$.

Figure 8:
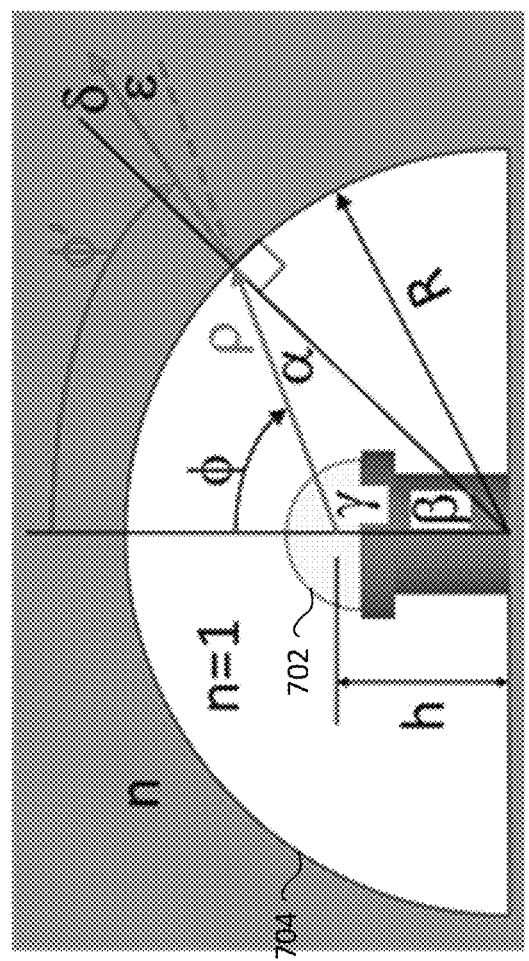
FIG. 8 is a diagram modeling the effect on focus when an imaging lens is placed in a simple dome.

The dome 704 may also affect the respective fields of view of the corresponding lens assemblies 702. As illustrated in FIG. 8, $\phi$ is the imaging ray angle in air and $\phi'$ is the imaging ray angle outside of the dome 704. Finally, there are internal angles $\alpha$, $\beta$ and $\gamma$ and external angles $\delta$ and $\epsilon$. Herein, the relationship between $\alpha$ and $\delta$ is to be found using Snell's law.

The law of sines provides the following:

$$\frac{|R|}{\sin \gamma} = \frac{h}{\sin \alpha} = \frac{\rho}{\sin \beta} \quad (7)$$

As a result, $$\sin \alpha = \frac{h \cdot \sin \gamma}{|R|} = \frac{h \cdot \sin(180 - \phi)}{|R|} = \frac{h \cdot \sin \phi}{|R|} \rightarrow \alpha = \sin^{-1}\left(\frac{h \cdot \sin \phi}{|R|}\right) \quad (8)$$

where R<0 in this geometry to obey optical definitions to follow. Then, using Snell's law, $$1 \cdot \sin \alpha = n \cdot \sin \delta \rightarrow \delta = \sin^{-1}\left(\frac{h \cdot \sin \phi}{|R| \cdot n}\right) \quad (9)$$

Therefore:

$$\epsilon = \delta - \alpha \quad (10)$$

and $$\phi' = \phi + \epsilon = \phi + \sin^{-1}\left(\frac{h \cdot \sin \phi}{|R| \cdot n}\right) - \sin^{-1}\left(\frac{h \cdot \sin \phi}{|R|}\right) \quad (11)$$

Therefore, Equations 11 and 10 can be used to calculate the new ray angle in water, $\phi'$, or the field of view change, $\epsilon$, respectively, as a function of $\phi$.

In addition to loss of field of view and a shift in the focal plane, taking a dome of air under water will cause a displacement of water. This principle can be applied to calculate the weight to be added to the system to make it neutrally buoyant under water. The mass of displaced water is calculated as:

$$M = D \cdot V \quad (12)$$

where M is the mass of the displaced water, D is the density of water (1 gm/cc) and V is the volume of displaced water. The volume of displaced water is given through simple geometry as $$V = \frac{4}{3} \cdot \pi \cdot |R|^3 \quad (13)$$

Next the weight of the camera and dome itself, m, is subtracted from M to achieve the final value for how much more weight can be added to the system to make it neutrally buoyant under water, B. This is given as $$B = M - m = \frac{4 \cdot \pi \cdot |R|^3 \cdot D}{3} - m \quad (14)$$

As an example, if R=−75 mm and m=0.8 kg then B≈1 kg. If R grows to −100 mm, then B grows to 3.4 kg for the same camera mass. This substantial growth in B (approximately 3.4 kg of buoyancy weight at R=−100 mm versus approximately 1 kg of buoyancy weight at R=−75 mm) comes with a somewhat better focus (approximately 8 um of defocus at R=−100 mm versus approximately 11 um of defocus at R=−75 mm) and a slightly lower FOV degradation (approximately 2.15 degrees of FOV loss at R=−100 mm versus approximately 2.9 degrees FOV loss at R=−75 mm). As can be seen from the examples above, the tradeoffs between field of view loss, focus, and buoyancy may be managed depending on the desired application.

The effects of the simple dome cover model described above may be even better approximated by instead modeling the dome as a positive lens. In this manner, by varying the power of this lens focus may be traded off with the dome in the water and/or in air and the lens dome's effect on field of view. As well, by adding glass weight to the dome by allowing it to thicken into a positive lens, the underwater buoyancy can also be improved.

Figure 9:
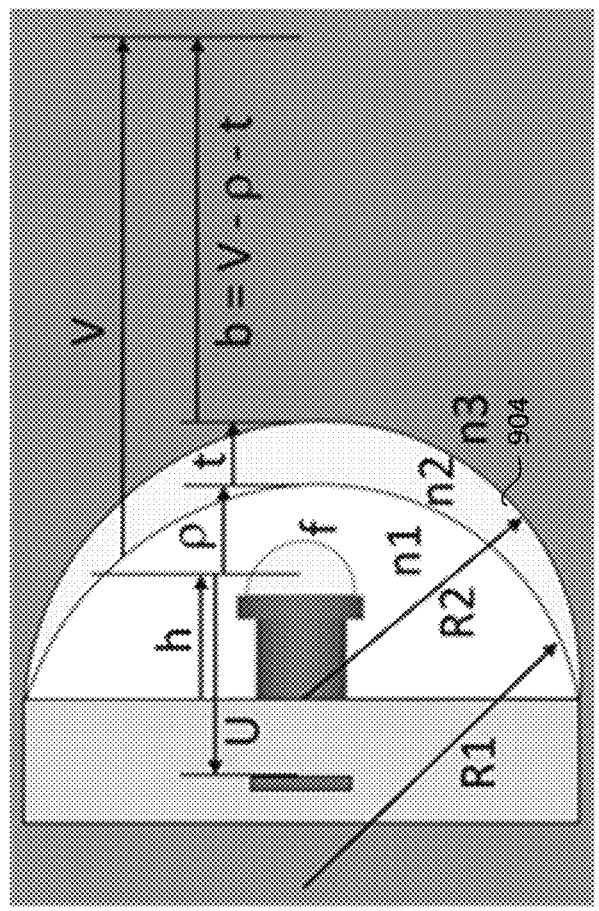
FIG. 9 is a diagram modeling the effect on focus when an imaging lens is placed in a dome modeled as a positive lens.

FIG. 9 diagrams the geometry to analyze the ABCD matrix mathematics for this system. In this system, the dome 802 is modeled as having an outer dome surface of radius, R1 and an inner dome surface of radius, R2. Using the parameters in FIG. 9, the ABCD system of equations becomes $$\begin{pmatrix} r' \\ \theta' \end{pmatrix} = \begin{pmatrix} 1 & b \\ 0 & 1 \end{pmatrix} \begin{pmatrix} \alpha & \beta \\ \chi & \delta \end{pmatrix} \begin{pmatrix} 1 & \rho \\ 0 & 1 \end{pmatrix} \begin{pmatrix} 1 & 0 \\ -\frac{1}{f} & 1 \end{pmatrix} \begin{pmatrix} 1 & U \\ 0 & 1 \end{pmatrix} \begin{pmatrix} r \\ \theta \end{pmatrix} \quad (15)$$

In Equation 15, the terms $\alpha, \beta, \chi, \delta$ come from the ABCD matrix for a thick lens, given as $$\begin{pmatrix} \alpha & \beta \\ \chi & \delta \end{pmatrix} = \begin{pmatrix} 1 & 0 \\ \frac{n_2 - n_3}{R_2 \cdot n_3} & \frac{n_2}{n_3} \end{pmatrix} \begin{pmatrix} 1 & t \\ 0 & 1 \end{pmatrix} \begin{pmatrix} 1 & 0 \\ \frac{n_1 - n_2}{R_1 \cdot n_2} & \frac{n_1}{n_2} \end{pmatrix} \quad (16)$$

Doing the math on Equation 16 then gives $$\alpha = 1 + t \cdot \left( \frac{n_1 - n_2}{R_1 \cdot n_2} \right) \quad (17a)$$

$$\beta = t \cdot \left( \frac{n_1}{n_2} \right) \quad (17b)$$

$$\chi = \left( \frac{n_2 - n_3}{R_2 \cdot n_3} \right) + t \cdot \left( \frac{n_1 - n_2}{R_1 \cdot n_2} \right) \cdot \left( \frac{n_2 - n_3}{R_2 \cdot n_3} \right) + \left( \frac{n_2}{n_3} \right) \cdot \left( \frac{n_1 - n_2}{R_1 \cdot n_2} \right) \quad (17c)$$

$$\delta = t \cdot \left( \frac{n_2 - n_3}{R_2 \cdot n_3} \right) \cdot \left( \frac{n_1}{n_2} \right) + \left( \frac{n_1}{n_3} \right) \quad (17d)$$

Solving Equation 15 for the focus condition (the B term is set to zero), the equation for U can be determined as $$U = \frac{(\rho \cdot \alpha + \beta + \rho \cdot \chi \cdot b + \delta \cdot b) \cdot f}{(\rho \cdot \alpha + \beta + \rho \cdot \chi \cdot b + \delta \cdot b) - (\alpha + \chi \cdot b) \cdot f} \quad (18)$$

In one example embodiment, it can be seen that when R2=−75 mm and R1=−175 mm, the net focus shift is zero microns, meaning that the system stays in focus when in the lens dome and underwater relative to when it is in air with no dome. Similarly, when R2=−100 mm and R1=−250 mm, the net focus shift is also zero microns. Under either of these two conditions, the system goes out of focus if it is pulled out of the water but left in the dome. For example, when R2=−75 mm and R1=−175 mm, the net focus shift is −22.5 microns in air. Also, when R2=−100 mm and R1=−250 mm, the net focus shift is −17 microns in air. In another embodiment, a compromise may be made such that there is a small net focus shift in both air and under water. For example, when R2=−75 mm and R1=−92 mm, the net focus shift is +9.2 um in water and −9.2 um in air with no dome, while when R2=−100 mm and R1=−125 mm, the net focus shift is +6.8 um in water and −6.8 um in air with no dome.

Example Camera Configuration

Figure 10:
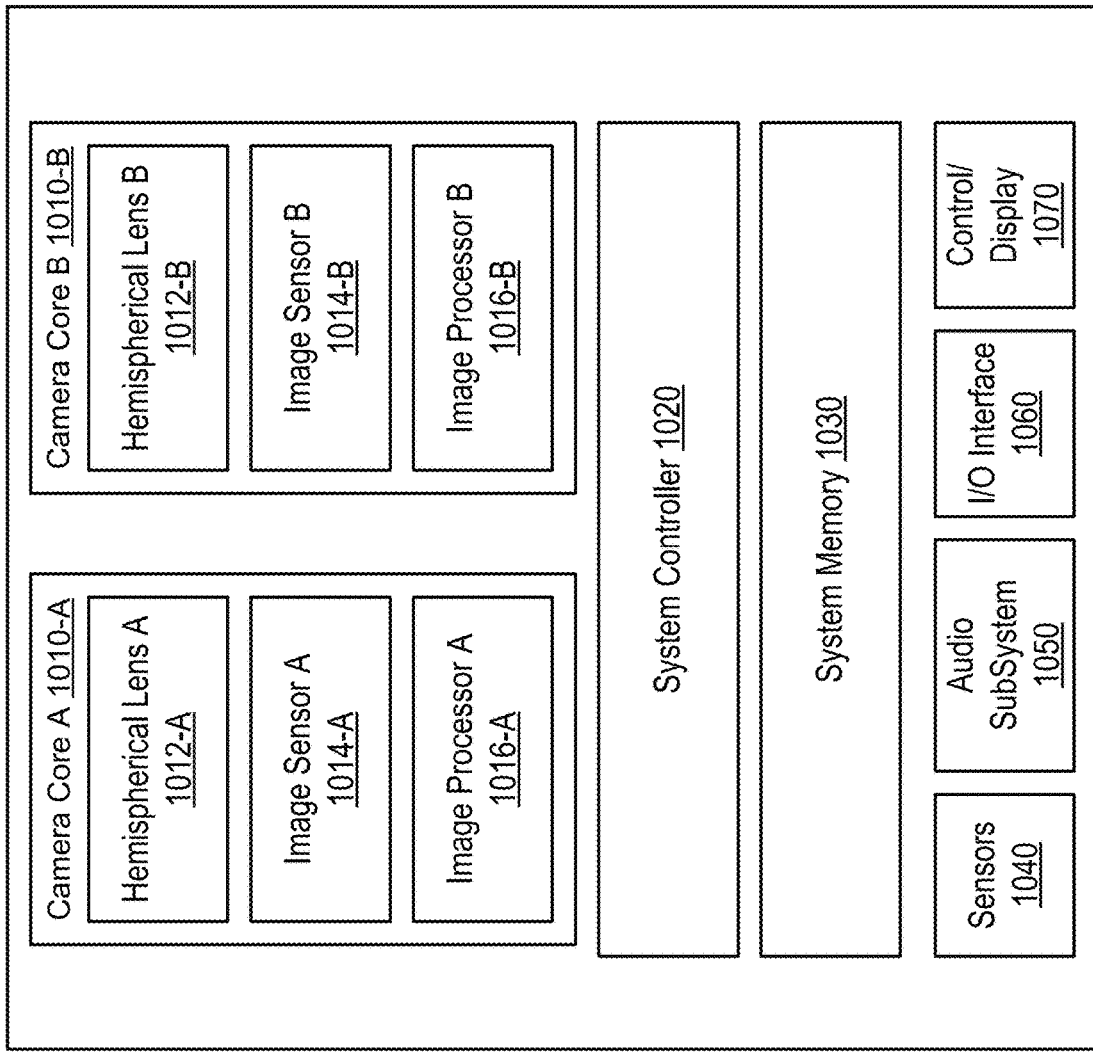
FIG. 10 is a block diagram illustrating an example embodiment of a dual-lens camera.

FIG. 10 is a block diagram illustrating a camera 100, according to one embodiment. In the illustrated embodiment, the camera 100 may comprise two camera cores 1010 (e.g., camera core A 1010-A and camera core B 1010-B) each comprising a hemispherical lens 1012 (e.g., hemispherical lens 1012-A and hemispherical lens 1012-B), an image sensor 1014 (e.g., image sensor 1014-A and image sensor 1014-B), and an image processor 1016 (e.g., image processor 1016-A and image processor 1016-B). The camera 100 may additionally include a system controller 1020 (e.g., a microcontroller or microprocessor) that controls the operation and functionality of the camera 100 and system memory 1030 that may be configured to store executable computer instructions that, when executed by the system controller 1020 and/or the image processors 1016, perform the camera functionalities described herein.

An input/output (I/O) interface 1060 may transmit and receive data from various external devices. For example, the I/O interface 1060 may facilitate the receiving or transmitting video or audio information through an I/O port. Examples of I/O ports or interfaces may include USB ports, HDMI ports, Ethernet ports, audioports, and the like. Furthermore, embodiments of the I/O interface 1060 may include wireless ports that can accommodate wireless connections. Examples of wireless ports may include Bluetooth, Wireless USB, Near Field Communication (NFC), and the like. The I/O interface 1060 may also include an interface to synchronize the camera 100 with other cameras or with other external devices.

A control/display subsystem 1070 may include various control and display components associated with operation of the camera 100 including, for example, LED lights, a display, buttons, microphones, speakers, and the like. The audio subsystem 1050 may include, for example, one or more microphones and one or more audio processors to capture and process audio data correlated with video capture.

Sensors 1040 may capture various metadata concurrently with, or separately from, video capture. For example, the sensors 1040 may capture time-stamped location information based on a global positioning system (GPS) sensor, and/or an altimeter. Other sensors 1040 may be used to detect and capture orientation of the camera 100 including, for example, an orientation sensor, an accelerometer, a gyroscope, or a magnetometer.

In alternative embodiments, one or more components of the camera cores 1010 may be shared between different camera cores 1010. For example, in one embodiment, the camera cores 1010 may share one or more image processors 1016. Furthermore, in alternative embodiments, the camera cores 1010 may have additional separate components such as, for example, dedicated system memory 1030 or system controllers 1020.

In one embodiment, the camera 100 may comprise a twin hyper-hemispherical lens system that capture two image hemispheres with synchronized image sensors which combine to form a contiguous spherical image. Each of the two streams generated by camera cores 910 may be separately encoded and then aggregated in post processing to form the spherical video. For example, each of the two streams may be encoded at 2880×2880 pixels at 30 frames per second and combined to generate a 5760×2880 spherical video at 30 frames per second. Other resolutions and frame rates may also be used.

In an embodiment the spherical content may be captured at a high enough resolution to guarantee the desired output from the relevant sub-frame will be of sufficient resolution. For example, if a horizontal field of view of 120° at an output resolution of 1920×1080 pixels is desired in the final output video, the original spherical capture may include a horizontal 360° resolution of at least 5760 pixels (3×1920).

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera system, comprising:
    a camera comprising:
        an image sensor positioned on an image plane; and
        a lens assembly to focus light onto the image sensor, the lens assembly comprising:
            a lens barrel housing a plurality of lens elements, the lens barrel adjustable between a first secured position at a first distance from the image sensor and a second secured position at a second distance from the image sensor, wherein light passing through the lens assembly is focused on the image plane when the camera is in open air and the lens barrel is in the first secured position;
            a first locking mechanism to secure the lens barrel in the first secured position; and
            a second locking mechanism to secure the lens barrel in the second secured position
    a watertight housing to enclose a volume of air around camera, the watertight housing comprising:
        a dome, wherein light passing through the dome and the lens assembly when the watertight housing is submerged underwater is focused onto the image plane when the lens barrel is in the second secured position at the second distance from the image sensor; and
        a mount for holding the camera within the watertight housing.

2. The camera system of claim 1, wherein the watertight housing further comprises:
    a mounting plate comprising a perimeter portion surrounding a cutout, the perimeter portion having a plurality of attachment points on a surface of the mounting plate for coupling to the dome, and wherein the mount is coupled to an edge of the perimeter portion.

3. The camera system of claim 2, wherein the dome comprises a transparent substantially hemispherical portion and a flange portion, the flange portion extending radially from a substantially circular edge of the first hemisphere portion, the flange portion having a surface that mates with the surface of the mounting plate and is secured with the mounting plate via the plurality of attachment points.

4. The camera system of claim 3, wherein the watertight housing further comprises:
    A compressible sealing element between the flange portion and the surface of the mounting plate.

5. The camera system of claim 1, wherein the lens barrel is further adjustable to a third secured position in between the first secured position and the second secured position.

6. The camera system of claim 1, wherein the lens assembly further comprises a lens mount having a first threaded interior surface that mates with a second threaded exterior surface of the lens barrel, and wherein the lens barrel is adjustable between the first secured position and the second secured position by rotating the lens barrel within the lens amount between a first rotational position and a second rotational position.

7. A camera system, comprising:
    a camera comprising:
        a first image sensor positioned on a first image plane;
        a first lens assembly to focus light onto the first image sensor, the first lens assembly comprising a first lens barrel housing a first plurality of lens elements, the first lens barrel adjustable between a first secured position at a first distance from the first image sensor and a second secured position at a second distance from the first image sensor, wherein light passing through the first lens assembly is focused on the first image plane when the camera is in open air and the first lens barrel is in the first secured position;
        a second image sensor positioned on a second image plane;
        a second lens assembly facing an opposite direction as the first lens assembly, the second lens assembly to focus light onto the second image sensor, the first lens assembly comprising a second lens barrel housing a second plurality of lens elements, the second lens barrel adjustable between a third secured position at a third distance from the second image sensor and a fourth secured position at a fourth distance from the second image sensor, wherein light passing through the second lens assembly is focused on the second image plane when the camera is in open air and the second lens barrel is in the third secured position;
    a watertight housing to enclose a volume of air around the camera, the watertight housing comprising:
        a first dome, wherein light passing through the first dome and the first lens assembly when the watertight housing is submerged underwater is focused onto the first image plane when the first lens barrel is in the second secured position at the second distance from the first image sensor;
        a second dome, wherein light passing through the second dome and second first lens assembly when the watertight housing is submerged underwater is focused onto the second image plane when the second lens barrel is in the fourth secured position at the fourth distance from the second image sensor; and
        a mount for holding the camera within the watertight housing.

8. The camera system of claim 7, wherein the first lens assembly is laterally offset from the second lens assembly.

9. The camera system of claim 7, wherein a perimeter of the first dome is aligned with a perimeter of the second dome.

10. The camera system of claim 7, wherein the watertight housing further comprises:
a mounting plate comprising a perimeter portion surrounding a cutout, the perimeter portion having a first plurality of attachment points on a first surface of the mounting plate for coupling to the first dome and a second plurality of attachment points on a second surface of the mounting plate for coupling to the second dome.

11. The camera system of claim 7,
wherein the first dome comprises a first transparent substantially hemispherical portion and a first flange portion, the first flange portion extending radially from a first substantially circular edge of the first hemisphere portion, the first flange portion having a first surface that mates with the first surface of the mounting plate and is secured with the mounting plate via the first plurality of attachment points; and
wherein the second dome comprises a second transparent substantially hemispherical portion and a second flange portion, the second flange portion extending radially from a second substantially circular edge of the second hemisphere portion, the second flange portion having a second surface that mates with the second surface of the mounting plate and is secured with the mounting plate via the second plurality of attachment points.

12. The camera system of claim 11, wherein the watertight housing further comprises:
a first compressible sealing element between the first flange portion and the first surface of the mounting plate; and
a second compressible sealing element between the second flange portion and the second surface of the mounting plate.

13. The camera system of claim 7,
wherein the first lens barrel is further adjustable to a secured position in between the first secured position and the second secured position; and
wherein the second lens barrel is further adjustable to a secured position in between the third secured position and the fourth secured position.

14. The camera system of claim 7,
wherein the first lens assembly further comprises a first lens mount having a first threaded interior surface that mates with a second threaded exterior surface of the first lens barrel, and wherein the first lens barrel is adjustable between the first secured position and the second secured position by rotating the first lens barrel within the first lens amount between a first rotational position and a second rotational position; and
wherein the second lens assembly further comprises a second lens mount having a third threaded interior surface that mates with a fourth threaded interior surface of the second lens barrel, and wherein the second lens barrel is adjustable between the third secured position and the fourth secured position by rotating the second lens barrel within the second lens amount between a third rotational position and a fourth rotational position.

15. The camera system of claim 7,
wherein the first lens assembly further comprises a first locking mechanism to secure the first lens barrel in the first secured position, and a second locking mechanism to secure the first lens barrel in the second secured position; and
wherein the second lens assembly further comprises a third locking mechanism to secure the second lens barrel in the third secured position, and a fourth locking mechanism to secure the second lens barrel in the fourth secured position.

16. A camera, comprising:
a first image sensor positioned on a first image plane;
a first lens assembly to focus light onto the first image sensor, the first lens assembly comprising:
a first lens barrel housing a first plurality of lens elements, the first lens barrel adjustable between a first secured position at a first distance from the first image sensor and a second secured position at a second distance from the first image sensor;
a first locking mechanism to secure the first lens barrel in the first secured position; and
a second locking mechanism to secure the first lens barrel in the second secured position;
a second image sensor positioned on a second image plane; and
a second lens assembly facing an opposite direction as the first lens assembly, the second lens assembly to focus light onto the second image sensor, the second lens assembly comprising:
a second lens barrel housing a second plurality of lens elements, the second lens barrel adjustable between a third secured position at a third distance from the second image sensor and a fourth secured position at a fourth distance from the second image sensor;
a third locking mechanism to secure the second lens barrel in the third secured position; and
a fourth locking mechanism to secure the second lens barrel in the fourth secured position.

17. The camera of claim 16,
wherein light passing through the first lens assembly is focused on the first image plane when the camera is in open air and the first lens barrel is in the first secured position; and
wherein light passing through the second lens assembly is focused on the second image plane when the camera is in open air and the second lens barrel is in the third secured position.

18. The camera of claim 16,
wherein light passing through the first lens assembly is focused on the first image plane when the camera is placed within a watertight dome and submerged underwater and the first lens barrel is in the second secured position at the second distance from the first image sensor; and
wherein light passing through the second lens assembly is focused on the second image plane when the camera is placed within a watertight dome and submerged underwater and the second lens barrel is in the fourth secured position at the fourth distance from the second image sensor.

19. The camera of claim 16, wherein the second distance is greater than the first distance and wherein the fourth distance is greater than the third distance.

* * * * *